(12) United States Patent  
Stöcklein et al.

(10) Patent No.: US 7,599,590 B2
(45) Date of Patent: Oct. 6, 2009

(54) OPTICAL CABLE AND METHOD FOR PRODUCTION OF AN OPTICAL CABLE

(75) Inventors: Waldemar Stöcklein, Coburg (DE); Gerhard Merbach, Coburg (DE); Horst Knoch, Coburg (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 12/251,760

(22) Filed: Oct. 15, 2008

(65) Prior Publication Data

US 2009/0136188 A1 May 28, 2009

Related U.S. Application Data

(63) Continuation of application No. PCT/EP2007/003500, filed on Apr. 20, 2007.

(30) Foreign Application Priority Data

Apr. 21, 2006 (DE) .................. 10 2006 018 536

(51) Int. Cl.
*G02B 6/44* (2006.01)
*B29D 11/00* (2006.01)

(52) U.S. Cl. .............. 385/110; 385/112; 385/113; 264/1.29

(58) Field of Classification Search .................. None
See application file for complete search history.

(56) References Cited

U.S. PATENT DOCUMENTS

| 4,078,853 A | 3/1978 | Kempf et al. | 350/96.23 |
| 5,389,442 A * | 2/1995 | Arroyo et al. | 428/396 |
| 5,621,841 A | 4/1997 | Field | 385/113 |
| 6,487,345 B1 * | 11/2002 | Dixon et al. | 385/100 |
| 6,876,800 B2 * | 4/2005 | Sutehall et al. | 385/113 |
| 2008/0292262 A1 * | 11/2008 | Overton et al. | 385/144 |
| 2008/0304798 A1 * | 12/2008 | Pavan et al. | 385/110 |

FOREIGN PATENT DOCUMENTS

| DE | 19602117 A1 | 7/1997 |
| DE | 19712253 A1 | 10/1998 |
| DE | 19910653 A1 | 9/2000 |
| DE | 102004037589 | 3/2006 |
| EP | 0023154 | 11/1983 |
| JP | 62-115109 | 5/1987 |
| WO | WO 00/58768 | 10/2000 |
| WO | WO 01/91135 A1 | 11/2001 |

* cited by examiner

*Primary Examiner*—Omar Rojas
(74) *Attorney, Agent, or Firm*—C. Keith Montgomery

(57) ABSTRACT

An optical cable comprises a swelling yarn, around which several optical transmission elements in the form of micromodules are arranged. A micromodule comprises a bundle of optic fibers, which are surrounded by a sleeve made from a material of plastic. Further swelling yarns are arranged around the optical transmission elements. The optical transmission elements and the swelling yarns are surrounded by a sleeve of paper. The paper sleeve is surrounded by a cable jacket made from a material of plastic. When an optic fiber is exposed, the cable jacket is pulled off, whereupon the paper sleeve tears off and can consequently be easily removed.

27 Claims, 2 Drawing Sheets

OPTICAL CABLE AND METHOD FOR PRODUCTION OF AN OPTICAL CABLE

CROSS-REFERENCE TO RELATED APPLICATIONS

This application is a continuation of International Application No. PCT/EP2007/003500, filed Apr. 20, 2007, which claims priority to German Application No. DE102006018536.6, filed Apr. 21, 2006, both applications being incorporated herein by reference.

BACKGROUND

1. Technical Field

This application relates to an optical cable, which can be used for blowing into an empty tube, and to a method for the production of an optical cable which can be used for blowing into an empty tube.

2. Technical Background

To set up access networks, telecommunications operators usually use optical cables which are blown into thin, preinstalled empty tubes made from a plastics material. Used in particular as such optical cables are so-called micromodule cables, in which the cable core is formed without any filling compound or is filled with a gel.

FIG. 1 shows a so-called dry micromodule cable with a cable core 100 without any filling compound. The cable core has a centrally arranged yarn 20 of polyester, arranged around which are several optical transmission elements 10, which are formed as so-called micromodules. A micromodule comprises several optic fibers 1, which are surrounded by a sleeve 2 made from a plastics material. The centrally arranged filament 20 contains a swellable material, which on contact with water brings about an increase in volume of the filament 20.

Furthermore, the cable core 100 is surrounded by a strip 400 formed into a sleeve. The sleeve 400 has a multilayered structure of polyester yarns. Between individual layers of the polyester fabric there is a swellable SAP (super absorbent polymer) material.

When water penetrates into the cable core 100, the SAP materials bring about swelling of the sleeve 400 and swelling of the filament 20. This prevents water that is inside the cable core 100 from spreading along the optical transmission elements 10, thereby preventing deterioration of the optical transmission properties.

Arranged over the sleeve 400 is a cable jacket 300. Apart from the function of preventing the spreading of water along the optical transmission elements in the cable core, the sleeve 400 protects the optical transmission elements 10 from high temperatures that occur during the extrusion of the jacket.

Apart from the dry embodiment of a micromodule cable that is shown in FIG. 1, micromodule cables in which the cable core is filled with a gel also exist. In the case of this type of cable, the gel which surrounds the optical transmission elements 10 prevents water from spreading along the micromodules 10 if there is any moisture penetration.

After a micromodule cable has been blown into an empty tube, the individual optic fibers of the micromodule cable are spliced with optic fibers of another micromodule cable or with some other item of hardwire. The cable ends of the micromodule cable must be suitably prepared for connection to the hardware. To expose the optic fibers, firstly the cable jacket is removed. After that, the cable core of the micromodule cable is also surrounded by the polyester fabric of the sleeve 400. The sleeve 400 is generally removed by cutting off the fabric with a cutting tool. In the case of an optical cable filled with gel, in a next step the exposed optic fibers are cleaned of the gel with a solution.

In the case of a dry micromodule cable, there is no need for gel to be cleaned from the optic fibers to be spliced, so that in the case of this type of cable it is already possible to save time for the preparation of the micromodule cable for the splicing operation. However, it may still be necessary after removal of the cable jacket to remove the swellable sleeve 400 with a knife or scissors. Apart from the time required for this, cutting off the sleeve 400 always also entails a risk of damaging the optic fibers.

The object of the present invention is to specify an optical cable that has good processing characteristics in the preparation of the optical cable for a splicing operation. A further object of the present invention is to specify a method for the production of an optical cable that has good processing characteristics in the preparation of the optical cable for a splicing operation.

The object with respect to the optical cable is achieved by an optical cable with a cable core with several optical transmission elements, which contain at least one optic fiber, with a first sleeve made from a material containing paper, the first sleeve surrounding the several optical transmission elements, with at least one yarn, which is arranged in a region of the cable core between the first sleeve and the several optical transmission elements, the at least one yarn comprising a swellable material, and with a cable jacket, which surrounds the first sleeve and contains a plastics material.

According to a development of the optical cable, the paper has a tear strength which is less than 16 N/mm². In a preferred embodiment, the paper has a tear strength which is more than 13 N/mm².

In the case of another embodiment of the optical cable, the optical cable has a diameter which is less than 6.5 mm. In a preferred embodiment of the optical cable, the optical cable has a diameter which is more than 3.5 mm.

In another configuration of the optical cable, the optical transmission element has several optic fibers, which are surrounded by a second sleeve. The second sleeve of the optical transmission element may be formed from a plastics material.

Another embodiment of the optical cable provides that the cable core is formed as a cable core without any filling compound.

In the case of a further configuration of the optical cable, the cable core has a centrally arranged yarn, around which the several optical transmission elements are arranged. The centrally arranged yarn may comprise a water-swellable material. The at least one yarn, which is arranged between the optical transmission elements and the first sleeve, and/or the centrally arranged yarn may be formed as a filament of polyester.

According to another embodiment of the optical cable, the swellable material contains an acrylate. The swellable material may also contain a salt of an acrylic acid.

A further embodiment of the optical cable provides that the cable jacket has at least two layers. In the case of one embodiment of the optical cable, a first of the at least two layers of the cable jacket, which is adjacent the first sleeve, contains polycarbonate. In the case of another embodiment of the optical cable, a first of the at least two layers of the cable jacket, which is adjacent the first sleeve, contains a polymer blend. In a preferred embodiment, a second of the at least two layers of the cable jacket, which is adjacent the first layer of the at least two layers of the cable jacket, contains high-density polyethylene. According to a development of the optical cable, a second of the at least two layers of the cable jacket, which is adjacent the first layer of at least two layers of the cable jacket, contains polyamide. In the case of a further configuration, a second of the at least two layers of the cable jacket, which is adjacent the first layer of the at least two layers of the cable jacket, contains polyurethane.

An optical cable which is formed according to the features specified above can be used with preference for blowing into an empty tube.

A method for the production of an optical cable envisages the provision of a cable core with several optical transmission elements, which respectively contain at least one optic fiber, at least one yarn being arranged around the several optical transmission elements, which yarn respectively contains a water-swellable material. The cable core is surrounded by the first sleeve, which contains a paper material. A cable jacket made from a plastics material is extruded around the first sleeve.

According to a development of the method, the strip is provided with a tear strength which is less than 16 N/mm$^2$. In the case of another embodiment of the method, the strip is provided with a tear strength which is more than 13 N/mm$^2$.

In the case of another embodiment of the method, the at least one optical transmission element is provided by several of the at least one optic fiber being arranged in a second sleeve, which contains a plastics material. In the case of a development of the method, the cable core is provided by several of the at least one optical transmission element being arranged around a yarn, which comprises a water-swellable material.

According to a further feature of the method, the cable core is provided as a cable core without any filling compound.

The strip made from the paper material is preferably formed into a first sleeve by means of a forming tube.

Another embodiment of the method provides that, when the cable jacket is extruded, a first layer of polycarbonate is extruded around the first sleeve and a second layer of high-density polyethylene is extruded around the first layer of the cable jacket.

Further embodiments concerning the optical cable and the method for the production of the optical cable can be taken from the subclaims.

DETAILED DESCRIPTION

Figure 1:
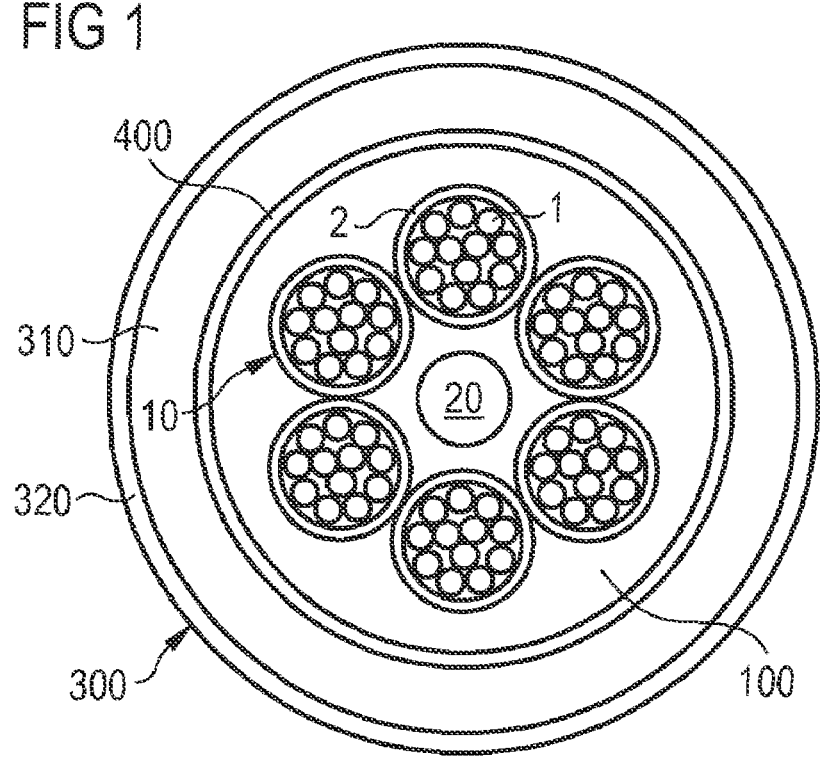
FIG. 1 shows an embodiment of an optical cable.
Figure 2:
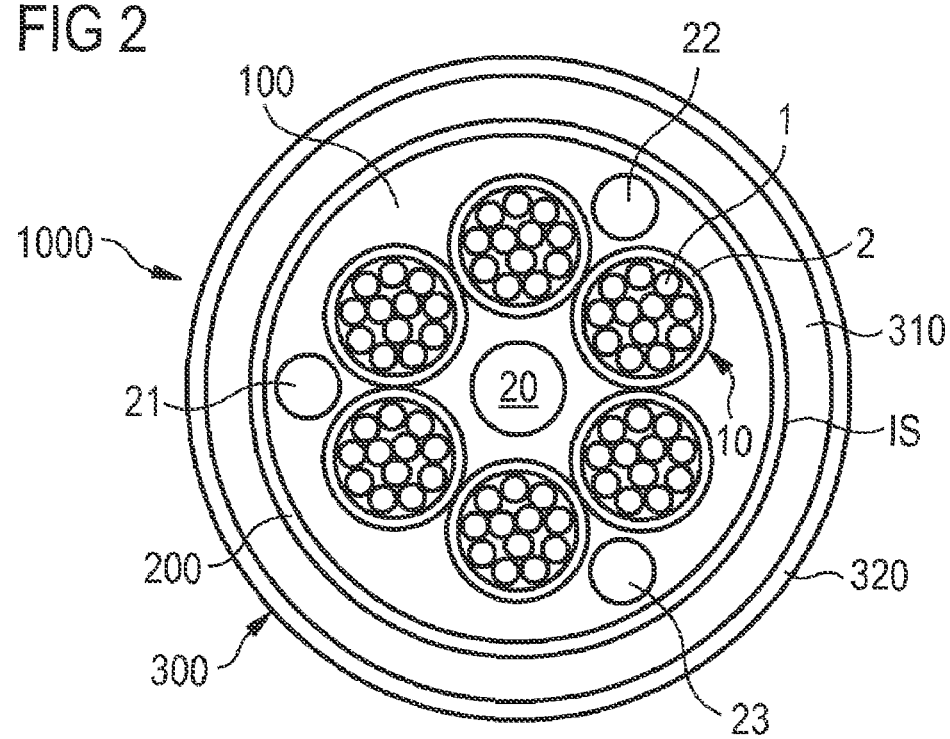
FIG. 2 shows a further embodiment of an optical cable.

FIG. 2 shows an optical cable 1000, which is formed as a micromodule cable and can be used for blowing into an empty tube. The micromodule cable shown in FIG. 2 can be used in particular for setting up an access network. When such cable networks are set up, the optical cables are blown into thin, preinstalled empty tubes made from a plastics material.

As shown in FIG. 2, the optical cable 1000 comprises a cable core 100, which contains a yarn 20, which is arranged centrally in the cable core 100. The yarn comprises a woven fabric of polyester, which contains several layers. Between the individual layers there is a swellable material (SAP material), which is embedded, generally in powder form, between the layers of the fabric. The swellable material contains an acrylate or salt of an acrylic acid. These substances bring about swelling of the yarn on contact with water.

The centrally arranged yarn 20 is surrounded by optical transmission elements 10. Each optical transmission element is formed as a micromodule, which respectively contains a number of optic fibers 1, which are surrounded by a sleeve 2 made from a plastics material. The cable core 100 of the micromodule cable is formed as a cable core without any filling compound. Arranged around the optical transmission elements 10 are further filaments 21, 22 and 23, which in the same way as the centrally arranged yarn 20 contain a swellable material, which brings about an increase in size of the volume of the filaments on contact with water.

The cable core 100 is surrounded by a sleeve 200, which contains a paper material. The paper contains mechanically or chemically pulped fibers, mostly of vegetable origin. These are first bonded together in an aqueous suspension and, with the addition of additives, consolidated on a screen by dewatering. The paper may contain bleached or unbleached pulps. Used with preference as the paper material is a tissue paper, which has a basis weight of up to 30 g/m$^2$. Furthermore, the paper of the sleeve preferably has a strength of between 13 newtons per square millimeter and 16 newtons per square millimeter.

The sleeve of paper is surrounded by a cable jacket 300. With preference, the cable jacket 300 has two layers 310 and 320. The layer 310 may contain a polycarbonate, while the layer 320 preferably contains high-density polyethylene. It is also possible to use a polymer blend as the material for the layer 310 of the cable jacket. The polymer blend represents a molecularly distributed or microscopically dispersed polymer alloy. The layer 310 of the cable jacket may also contain polyamide.

The layers 310 and 320 of the cable jacket 300 are extruded around the cable core 100 and the paper sleeve 200 in the course of an extrusion operation. The paper sleeve 200 accordingly lies against an inner side IS of the layer 310 of the cable jacket 300. The paper sleeve 200 acts as a heat barrier, which prevents the high temperatures that occur in the extrusion from being transferred to the optical transmission elements 10 of the cable core 100. This avoids the micromodules 10 sticking to one another or to the cable jacket during the extrusion of the cable jacket 300.

With preference, the cable core 100 is formed as a cable core without any filling compound. Since the paper of the sleeve 200 is swellable to a limited extent, the yarn 20 and the filaments 21, 22 and 23 arranged around the micromodules are arranged in the cable core 100. When water penetrates into the cable core, the swellable substances that are contained in the centrally arranged yarn 20 and in the peripherally arranged filaments 21, 22 and 23 bring about an increase in the volume of the yarn or of the filaments, so that the optical transmission elements are surrounded by the swollen yarn 20 or the swollen filaments 21, 22 and 23 and are consequently protected from moisture.

The provision of a sleeve 200 of paper has advantages over the previously used strip 400 of polyester, in particular in the preparation of the optical cable for a splicing operation. To expose the optic fibers, in the case of the embodiment of the optical cable that is shown in FIG. 2 firstly the cable jacket 300 is scored with a cutting tool. The optical cable is subsequently bent at the scored location of the cable jacket 300 and pulled. As a result, the plastics material of the tubular sleeve of the cable jacket 300 breaks, so that the end of the tubular sleeve can be pulled off the cable core 100 from the scored location with little force being exerted.

On account of the strength of the sleeve 200, which lies between thirteen newtons per square millimeter and sixteen newtons per square millimeter, the paper sleeve also tears, and can consequently be removed at the same time. In the case of the embodiment of the optical cable that is shown in FIG.

2, the previously required cutting off of the sleeve of polyester material is no longer required. As a result, the time necessary for a splicing operation and the risk of damaging the micromodules or optic fibers in the preparation of a micromodule cable are reduced.

Figure 3:
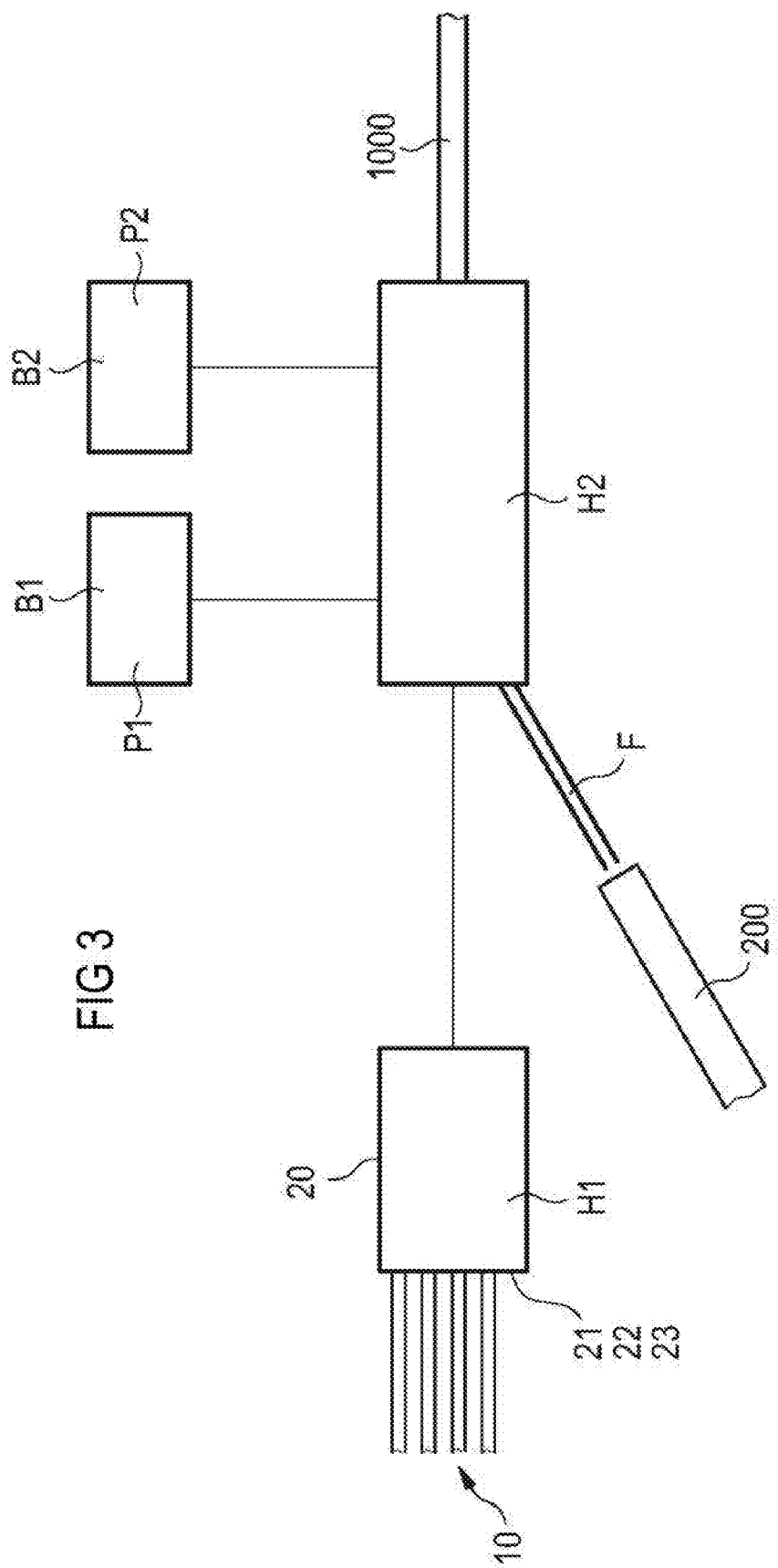
FIG. 3 shows an arrangement for the production of an optical cable.

A method for the production of an optical cable which can be used for blowing into an empty tube is specified below. FIG. 3 shows for this purpose a simplified embodiment of a production line for the production of a micromodule cable. Optical transmission elements in the form of micromodules 10 are fed to a production unit H1. A micromodule has an optical fiber bundle comprising a number of optic fibers 1, which are surrounded by a thin sleeve 2 made from a plastics material. Furthermore, yarns 20, 21, 22 and 23, which contain a swellable material which brings about an increase in volume of the yarns on contact with water, are fed to the production unit H1. The production unit H1 is formed in such a way that the micromodules 10 are arranged around the yarn 20. Furthermore, the yarns 21, 22 and 23 are arranged around the optical transmission elements 10 in the production unit H1, as shown in FIG. 2.

The cable core 100, which comprises the micromodules 10 and the swelling yarns 20, 21, 22 and 23, is subsequently fed to a production unit H2. Connected to the production unit H2 is a forming tube F. Fed to the forming tube on the input side is a strip of a paper material, which in one embodiment of the optical cable has a thickness of about 0.05 of a millimeter and a width of about 13 millimeters. Such a paper strip is suitable for the production of a micromodule cable with an outside diameter of about 6 millimeters.

The production unit H2 is connected to a container B1, in which a polymer P1 is located. Furthermore, the production unit H2 is connected to a container B2, in which a material of a polymer P2 is located. Firstly, the polymer material in the container B1 is heated and extruded as a layer 310 around the sleeve 200 of paper. Polycarbonate is used with preference as the polymer material.

Subsequently, the polymer mixture P2, which is located in the container B2, is heated and applied as the outer layer 320 around the inner layer 310 of the cable jacket. The sleeve 200 of paper thereby acts as a thermal separating layer, which prevents the sleeves 2 of the micromodules from sticking to one another on account of the high temperatures that occur during the extrusion operation. After the jacket layers 310 and 320 have cooled down, the cable jacket forms a tubular sleeve, in which the micromodules 10 are arranged. The sleeve 200 of paper lies against the inner side IS of the inner layer 310 of the cable jacket. Optical cables produced in this way have a diameter of between 3.5 millimeters and 6.5 millimeters.

What is claimed is:

1. An optical cable, comprising:
   a cable core with a plurality of optical transmission elements, each optical transmission element including at least one optic fiber;
   a first sleeve made from a material containing paper, the first sleeve surrounding the plurality of optical transmission elements, the paper having a tear strength which is less than 16 newtons per square millimeter;
   at least one yarn arranged in a region of the cable core between the first sleeve and the plurality of optical transmission elements, the at least one yarn comprising a swellable material; and
   a cable jacket surrounding the first sleeve and containing a plastics material.

2. The optical cable of claim 1, the paper having a tear strength which is more than 13 newtons per square millimeter.

3. The optical cable of claim 1, the optical cable having a diameter of less than 6.5 millimeters.

4. The optical cable of claim 3, the optical cable having a diameter of more than 3.5 millimeters.

5. The optical cable of claim 1, each optical transmission element having a plurality of optic fibers, which are each surrounded by a second sleeve.

6. The optical cable of claim 5, the second sleeves comprising a plastics material.

7. The optical cable of claim 1, the cable core being formed as a cable core without any filling compound.

8. The optical cable of claim 1, the cable core having a centrally arranged yarn, around which the plurality of optical transmission elements are arranged.

9. The optical cable of claim 8, the centrally arranged yarn comprising a water-swellable material.

10. The optical cable of claim 9, the at least one yarn or the centrally arranged yarn respectively being formed as a filament of polyester.

11. The optical cable of claim 9, the swellable material containing an acrylate.

12. The optical cable of claim 9, the swellable material containing a salt of acrylic acid.

13. The optical cable of claim 1, the cable jacket having at least two layers.

14. The optical cable of claim 13, a first of the at least two layers of the cable jacket, which is adjacent the first sleeve, containing polycarbonate.

15. The optical cable of claim 13, a first of the at least two layers of the cable jacket, which is adjacent the first sleeve, containing a polymer blend.

16. The optical cable of claim 13, a second of the at least two layers of the cable jacket, which is adjacent the first layer of the least two layers of the cable jacket, containing high-density polyethylene.

17. The optical cable of claim 13, a second of the at least two layers of the cable jacket, which is adjacent the first layer of the least two layers of the cable jacket, containing polyamide.

18. The optical cable of claim 13, a second of the at least two layers of the cable jacket, which is adjacent the first layer of the least two layers of the cable jacket, containing polyurethane.

19. The use of an optical cable of claim 1 for blowing into an empty tube.

20. A method for the production of an optical cable, comprising:
   providing a cable core, each cable core having a plurality of optical transmission elements, each optical transmission element containing at least one optic fiber, and at least one yarn containing a water-swellable material, being arranged around the plurality of optical transmission elements;
   surrounding the cable core with a first sleeve containing a paper material, wherein the first sleeve is provided with a tear strength which is less than 16 newtons per square millimeter; and
   extruding a plastic jacket comprising a plastics material around the first sleeve.

21. The method of claim 20, wherein the first sleeve is provided with a tear strength which is more than 13 newtons per square millimeter.

22. The method of claim 20, wherein the plurality of optical transmission elements are respectively provided by several of the at least one optic fiber being arranged in a second sleeve, which contains a plastics material.

23. The method of claim 20, wherein the cable core is provided by the plurality of optical transmission elements being arranged around a centrally arranged yarn, which comprises a water-swellable material.

24. The method of claim 20, wherein the cable core is provided as a cable core without any filling compound.

25. The method of claim 20, wherein the first sleeve made from the paper material by a forming tube.

26. The method of claim 20, wherein, when the cable jacket is extruded, a first layer of polycarbonate is extruded around the first sleeve and a second layer of high-density polyethylene is extruded around the first layer of the cable jacket.

27. An optical cable, comprising:
- a cable core with a plurality of optical transmission elements, which respectively contain at least one optic fiber;
- a first sleeve made from a material containing paper having tear strength of less than 16 newtons per square millimeter, the first sleeve surrounding the plurality of optical transmission elements;
- at least one yarn, which is arranged in a region of the cable core between the first sleeve and the plurality of optical transmission elements, the at least one yarn comprising a swellable material, and the at least one yarn including a centrally arranged yarn, around which the plurality or optical transmission elements are arranged; and
- a cable jacket surrounding the first sleeve amid containing a plastics material, wherein,
- the optical cable has a diameter between 3.5 and 6.5 millimeters.

* * * * *